Oct. 15, 1929.  E. COURTIN ET AL  1,731,971
PROTECTIVE ARRANGEMENT
Filed Dec. 16, 1927
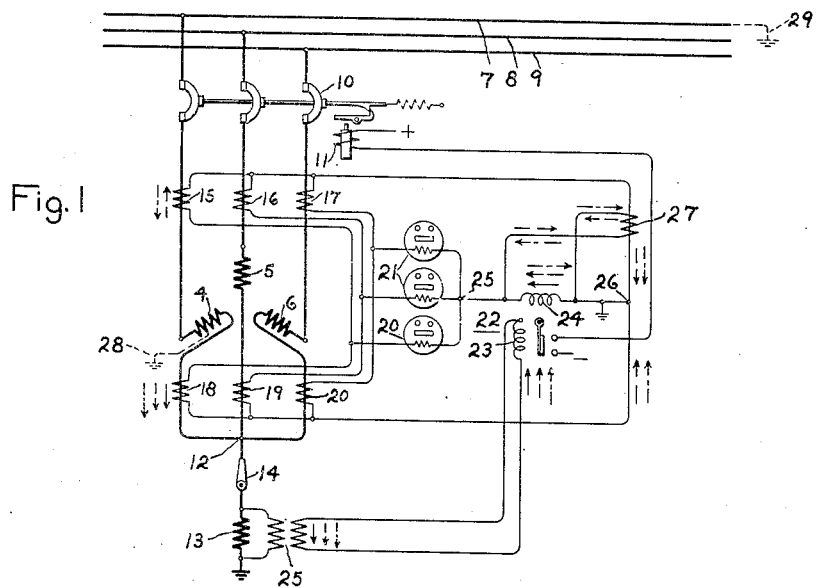
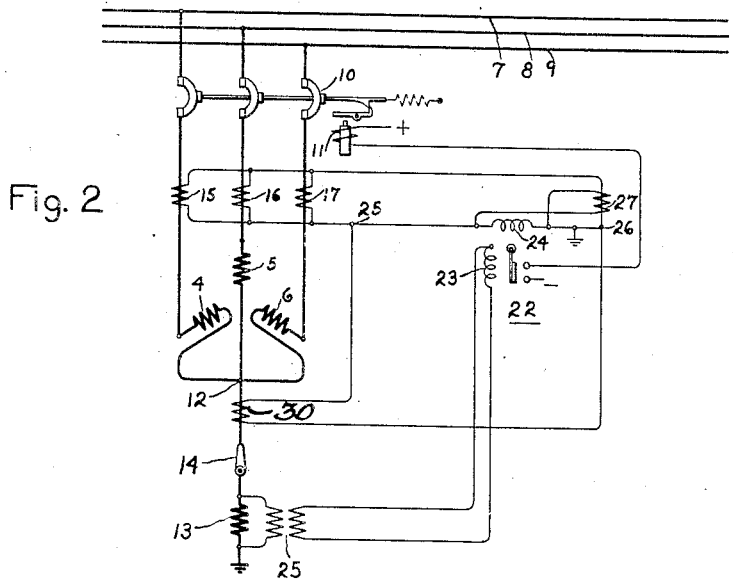
Inventors:
Eberhard Courtin,
Johann Bayer,
by
Their Attorney.

Patented Oct. 15, 1929

1,731,971

UNITED STATES PATENT OFFICE

EBERHARD COURTIN, OF WILMERSDORF-BERLIN, GERMANY, AND JOHANN BAYER, OF PFAFFSTATTEN, AUSTRIA, ASSIGNORS TO GENERAL ELECTRIC COMPANY, A CORPORATION OF NEW YORK

PROTECTIVE ARRANGEMENT

Application filed December 16, 1927, Serial No. 240,575, and in Germany January 12, 1927.

Our invention relates to improvements in protective arrangements for electric circuits and more particularly to the protection of electric circuits and apparatus on the occurrence of ground faults, and has for an object to provide an improved arrangement for protecting electric circuits and apparatus on the occurrence of ground faults.

In order to avoid damage on the occurrence of a ground falt on the windings of electric apparatus such as a generator, the ground fault current should not exceed a predetermined value even during the time which the protective apparatus requires to function. The protective apparatus must therefore be responsive to a sufficiently small ground fault current. If this current, however, as is often the case in large generators, grounded through a current limiting device, is only a fraction of the normal load current, the unavoidable differences in the protective transformers connected to provide a current proportional to the ground fault current have a disturbing effect. These differences may be magnetic inequalities in the transformers, stray field effects, and unequal impedances of the secondary circuits. Consequently, even under the influence of normal load currents, a false current tending to effect the operation of the ground fault protective apparatus may occur and on the occurrence of a ground fault outside the protected zone may cause the disconnection of the generator.

In accordance with our invention, which is an improvement on the invention disclosed in the copending application of Alexander v. Schaubert for protective arrangement, Serial No. 206,065, filed July 15, 1927, and assigned to the same assignee as this invention, those false currents are rendered ineffective by means of suitable connections of protective apparatus such as transformers and relays whereby the grounding resistance of each generator can be dimensioned in accordance with the operation of its own relay without regard to the operation of other generators and whereby smaller resistances are required and greater security is provided.

Our invention will be better understood from the following description when considered in connection with the accompanying drawing and its scope will be pointed out in the appended claims.

In the accompanying drawing, Fig. 1 illustrates diagrammatically an embodiment of our invention as applied to the protection of a three-phase generator; and Fig. 2 illustrates diagrammatically a modification of our invention.

In these figures, electrical apparatus such as a generator has windings 4, 5, 6 which are connected in star and which are arranged to be connected to the conductors of an electric circuit such as busses 7, 8, 9 by suitable connecting means such as a circuit breaker 10. This is shown as of the latched closed type having a trip coil 11. The neutral 12 of the generator may be connected to ground through a suitable impedance such as a resistor 13 or directly and a disconnecting switch 14 may be provided in the neutral to ground connection.

As shown in Fig. 1, the generator is provided with a known form of circulating current differential protection comprising transforming means on each side of the generator windings such as current transformer groups 15, 16, 17 and 18, 19, 20 and relays 21. In accordance with our invention, we provide means such as a relay 22 for so controlling the circuit breaker 10 as to effect the opening thereof on the occurrence of a ground fault only between the points where the current transformer groups are located. This relay may be of the dynamometer or induction disk directional types, examples of which are well known to the art, and as shown schematically comprises two cooperating windings 23, 24. The winding 23 is arranged to be energized in accordance with the current in the neutral to ground connection as by a potential transformer 25 whose primary is connected across the resistor 13 and therefore has an electromotive force dependent on the current in the resistor. The winding 24 is arranged to be energized in accordance with the difference between the residual currents of the circuit at two points as, for example, on each side of the generator. For this purpose, the winding 24 may be connected between the points 25, 26 of the residual secondary circuits of the parallel connected transformers 15, 16, 17 and the parallel connected transformers 18, 19, 20. The connections are such that on the occurrence of a ground fault between the points at which the transformer groups are connected, the difference between the residual currents at these points appears in the winding 24 in a direction to cause it to cooperate with the winding 23 in a manner to tend to effect operation of the relay 22.

In accordance with our invention, we provide means in the secondary circuit of the current transformers tending to prevent the operation of the relay 22 on the occurrence of a ground fault on the circuit external to the points where the transformer groups are located. As shown in Fig. 1, this means comprises a current transformer 27 whose primary is connected in the residual circuit of the current transformers 15, 16, 17 at one point and whose secondary is connected to supply the winding 24 with a current dependent on the residual current at this point and in a direction tending to prevent operation of the relay for ground faults outside the protected zone. As shown the transformer 27 is connected in the residual circuit of the current transformers at the point more remote from the neutral to ground connection.

In case of a ground fault in the protected zone no residual or earth leakage current appears in the current transformers 15, 16, 17 when there are no other sources than the generator shown, when the circuit breaker 10 is open or when other sources operating in parallel or other neutrals are not grounded. Under these conditions assuming a ground fault on the generator winding 4 as at 28, the fault current as reflected in the various protective circuits may be represented by the full line arrows which are of course merely intended to represent relative directions of currents in the relay windings. In this case, the torque of the relay 22 is in a direction to effect the closing of its contacts and thereby the opening of the circuit breaker 10.

Assuming now a ground fault on the generator as at 28 which may also be fed by another source, the circuit breaker 10 being closed, then the fault current as reflected in the various protective circuits may be represented by the dashed line arrows. In this case the vector difference between the residual currents on each side of the generator is in effect their arithmetic sum since they are substantially in phase opposition. This difference appears in the relay winding 24 as is obvious and in conjunction with the current in the winding 23 effects the operation of the relay 22. It is also to be noted that in this case the current output of the intermediate transformer 27 is in a direction to assist the difference current and make more certain the operation of the relay.

If, now, the transformers 15, 16, 17, 18, 19, 20 have the same transformation ratio and if all have identical characteristics, then on the occurrence of a ground fault outside the protected zone, no current, theoretically at least, will appear in the relay coil 24 since the residual currents on each side of the generator are equal and in the same direction so that their difference is zero. Practically this is difficult, if not impossible, to obtain and it is for such conditions that our invention is especially intended.

Assuming now a ground fault external to the zone of protection as at 29 on the bus 7, then the fault current as reflected in the various protective circuits may be represented by the dash and dot line arrows. In this case, the vector difference of the residual currents, which should be zero but may not because of different transformer characteristics, may flow in the relay winding 24 in either direction. This difference although comparatively small may be large enough and in the right direction to cause the undesired operation of the relay 22. If, however, it is in a direction tending to cause the operation of the relay, it is more than offset by the secondary current output of the intermediate transformer 27 imposed on the relay winding 24 in a direction to prevent the operation of the relay. The current output of this transformer, it is to be noted, is dependent not on the difference between the residual currents at the two points but the residual current at one point and is impressed directly on the relay winding 24 through any suitable transformation ratio in a direction tending to prevent the operation of the relay 22. Since it is extremely unlikely that the residual current appearing in the current transformer secondaries at one point may be anywhere near double that at the other, a one to one ratio may be used with great security for the reason that the difference current would then be less than the current output of the intermediate transformer 27.

Instead of having a plurality of current transformers on each side of the generator as shown in Fig. 1, the group on one side as shown in Fig. 2 may be replaced by a single transformer 30 connected to be energized in accordance with the residual current on that side as, for example, in the neutral to ground connection. The secondary of this transformer is then connected to the points 25, 26 across the relay winding 24 so that this winding is energized in accordance with the difference between the residual currents on the ground and supply sides of the generator. The operation of this modification of our invention is substantially the same as the operation of the arrangement shown in Fig. 1.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. In combination with an electric circuit having a grounded neutral, a directional relay having two cooperating windings one of which is connected to be energized in accordance with the current in the neutral to ground connection, current transforming means at two points of the circuit having their secondaries connected and arranged to energize the other of said windings in accordance with the difference between the residual currents of the circuit at said points, and a current transformer having its primary connected to be energized in accordance with the residual current at one of said points and its secondary connected to energize said other winding on the occurrence of a ground fault external to the portion of the circuit between said points with a current in a direction tending to prevent the operation of the relay.

2. In combination with an electric circuit having a grounded neutral, a directional relay having two cooperating windings one of which is connected to be energized in accordance with the current in the neutral to ground connection, current transformers at two points of the circuit having their secondaries connected and arranged to energize the other of said windings in accordance with the difference between the residual currents of the circuit at said points, and transforming means arranged to energize said other winding and connected in the secondary circuit of said current transformers for supplying said other winding with a current dependent on the residual current at one of said points and in a direction tending to prevent the operation of the relay on the occurrence of a ground fault on the circuit external to the portion between said points.

3. In combination with an electric circuit having a ground connection, a directional relay having two cooperating windings one of which is connected to be energized in accordance with the current in the ground connection, transforming means at two points of the circuit having their secondaries connected and arranged to energize the other of said windings on the occurrence of a ground fault in accordance with the difference between the fault currents at said points, and means arranged to energize said other winding and connected in the secondary circuit of the transforming means at the point more remote from the ground connection for supplying said other winding with a current dependent on the fault current at said more remote point and in a direction tending to prevent the operation of the relay when the ground fault is external to the portion of the circuit between said points.

4. In combination with an electric circuit having a ground connection, a relay having two cooperating windings one of which is connected to be energized in accordance with the current in the ground connection, transforming means at two points of the circuit having their secondaries connected and arranged to energize the other of said windings in accordance with the difference between the residual currents of the circuit at said points, and means arranged to energize said other winding and connected in the secondary circuit of the transforming means for supplying said other winding with a current dependent on the residual current at one of said points and in a direction tending to prevent the operation of the relay on the occurrence of a ground fault on the circuit external to the portion between said points.

5. In combination with a three-phase circuit, a generator having star connected windings with a grounded neutral, and means for connecting the generator to the circuit, means for effecting the opening of the connecting means only on the occurrence of a ground fault on the generator including a directional relay arranged to control said connecting means and having two cooperating windings, one being connected to be energized in accordance with the current in the neutral to ground connection, transforming means for energizing the other of said relay windings in accordance with the difference between the residual currents in the conductors on each side of the generator, and means in the secondary circuit of the transforming means on the supply side of the generator arranged to be energized in accordance with the residual current of said supply side and connected to supply said other winding with a current in a direction tending to prevent the operation of the relay on the occurrence of a ground fault external to the generator.

In witness whereof, EBERHARD COURTIN has hereunto set his hand this 15th day of November, 1927, and JOHANN BAYER has hereunto set his hand this 23rd day of November, 1927.

EBERHARD COURTIN.
JOHANN BAYER.